(12) United States Patent
Kim

(10) Patent No.: US 6,364,398 B1
(45) Date of Patent: Apr. 2, 2002

(54) DOOR STRUCTURE OF VEHICLE

(75) Inventor: Jong-Chan Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/447,335

(22) Filed: Nov. 22, 1999

(30) Foreign Application Priority Data

Jun. 10, 1999 (KR) ............................................. 99-10279

(51) Int. Cl.[7] ............................. B60J 5/04; B62D 25/04
(52) U.S. Cl. ....................................... 296/146.6; 49/502
(58) Field of Search .......................... 296/146.5, 146.6; 49/502

(56) References Cited

U.S. PATENT DOCUMENTS

| | | | | |
|---|---|---|---|---|
| 2,200,555 A | * | 5/1940 | Krogh ........................... | 49/502 |
| 3,936,090 A | * | 2/1976 | Aya et al. ................. | 296/146.6 |
| 4,090,734 A | * | 5/1978 | Inami et al. .............. | 296/146.6 |
| 4,684,166 A | * | 8/1987 | Kanodia ................... | 296/146.6 |
| 4,866,883 A | * | 9/1989 | Brown et al. ............. | 296/146.5 |
| 4,945,682 A | * | 8/1990 | Altman et al. ............ | 296/146.5 |
| 5,404,690 A | * | 4/1995 | Hanf ........................ | 296/146.6 |
| 5,542,738 A | * | 8/1996 | Walker et al. ............ | 296/146.6 |
| 5,553,910 A | * | 9/1996 | Park ......................... | 296/146.6 |
| 5,573,298 A | * | 11/1996 | Walker et al. ............ | 296/146.6 |
| 5,580,120 A | * | 12/1996 | Nees et al. ............... | 296/146.6 |
| 5,599,057 A | * | 2/1997 | Hirahara et al. ......... | 296/146.6 |
| 5,600,931 A | * | 2/1997 | Jonsson .................... | 296/146.6 |
| 5,755,484 A | * | 5/1998 | Chou et al. ............... | 296/146.6 |
| 5,785,376 A | * | 7/1998 | Nees et al. ............... | 296/146.6 |
| 5,813,719 A | * | 9/1998 | Kowalski .................. | 296/146.6 |
| 5,857,734 A | * | 1/1999 | Okamura et al. ........ | 296/146.6 |
| 5,865,496 A | * | 2/1999 | Odan et al. ............... | 296/146.6 |
| 5,868,456 A | * | 2/1999 | Kowalshi et al. ........ | 296/146.6 |
| 5,887,938 A | * | 3/1999 | Topker et al. ............ | 296/146.6 |
| 5,908,216 A | * | 6/1999 | Townsend ................. | 296/146.6 |
| 6,036,251 A | * | 3/2000 | Yagishita et al. ........ | 296/146.6 |
| 6,039,387 A | * | 3/2000 | Choi ......................... | 296/146.6 |
| 6,065,797 A | * | 5/2000 | Shirasaka ................. | 296/146.6 |
| 6,096,403 A | * | 8/2000 | Wycech .................... | 296/146.6 |
| 6,135,541 A | * | 10/2000 | Geise et al. .............. | 296/146.6 |

FOREIGN PATENT DOCUMENTS

| | | | | |
|---|---|---|---|---|
| JP | 0018784 | * | 1/1989 | ................. 296/209 |
| JP | 404300716 A | * | 10/1992 | .............. 296/146.6 |
| JP | 405169974 A | * | 7/1993 | .............. 296/146.6 |

* cited by examiner

Primary Examiner—Joseph D. Pape
Assistant Examiner—Hilary Gutman
(74) Attorney, Agent, or Firm—Christie, Parker & Hale, LLP

(57) ABSTRACT

A door structure of a vehicle wherein installment inside the door of a pushing member contacting an outer panel at a position facing a side of an upper body of a passenger causes the passenger to be pushed beforehand inside the vehicle by an initial weak shock during a side collision of the vehicle and the strong shock of last stage not to be directly transmitted to the passenger, remarkably decreasing the injury of the passenger, the pushing member comprising: a main body unit; a bent side wall unit extended from a periphery of the main body unit to form a predetermined space; and a flange unit extended to the side wall unit, bent outwardly and directly contacting an inner side surface of the outer panel.

3 Claims, 6 Drawing Sheets

DOOR STRUCTURE OF VEHICLE

BACKGROUND OF THE INVENTION

1. Field of the Invention

The present invention relates to a door of a vehicle, and more particularly to a door structure of vehicle adapted to install a pushing member in a door to reduce a damage to sides of a passenger during side collision of a vehicle, thereby providing a maximum safety to the passenger.

2. Description of the Prior Art

Generally, a vehicle is equipped with a door hinged to a body of the vehicle for a passenger to get in and out of the vehicle and the door 10 is manufactured as illustrated in FIGS. 1 and 2 with an outer panel 11 and an inner panel 12. The inner panel 12 is attached with a trim material 13 as inside material, which is then assembled with an arm rest 14 of protruding shape and the arm rest 14 is attached thereunder with a door pocket 15 for accommodating less voluminous small stuffs.

Meanwhile, the door 10 is so manufactured as to reinforce a structural strength to provide a safety to a passenger when a vehicle is laterally collided. In other words, an inner space formed by the outer panel 11 and the inner panel 12 is arranged with a reinforcing member 16 which is vertically attachable along a horizontal direction of the door 10, as illustrated in FIG. 3. The reinforcing member 16 vertically arranged along the horizontal direction of the door 10 serves to absorb an external shock applied from the door 10 when a vehicle is side-collided and to reduce deformation of the door 10, thereby promoting safety of a passenger.

However, there is a problem in that, even when the vehicle is equipped with the reinforcing member 16 at the door 10, some safety regulations regarding the sides of the upper torso of a passenger during a side collision of a vehicle (a European regulation limiting to within 42 mm of a deformation relative to a side of a dummy corresponding to ribs of a human body during a side collision of a vehicle) cannot be fully satisfied. This is because a two-panel door comprised of an outer panel 11 and an inner panel 12 is essentially compressed into a single-panel door instantaneously by the shock force created by a side impact collision. The resulting single-panel door transmits the shock force of the side impact collision directly to the upper torso of a passenger.

In other words, there is a limit in satisfying the related regulations by reducing injuries to the human body according to reinforcement of structural strength to the door 10. There is a need to satisfy the related regulations by reducing injuries to the human body during side collision of a vehicle through other countermeasures outside of the reinforcement of the structural strength and to promote safety to the passenger as well.

SUMMARY OF THE INVENTION

The present invention is disclosed to solve the aforementioned problems and it is an object of the present invention to provide a door structure of a vehicle adapted to transmit a mild shock first to a passenger before a two-panel door is transformed to a one-panel door by shock during a side collision of a vehicle, pushing the position of the passenger, such that a further stronger shock thereafter cannot reach the human body directly thereby reducing injury to the passenger.

In accordance with the objection of the prevent invention, there is provided a door structure of a vehicle, the structure comprising:

a main body unit frontly opened at an inner side surface of an outer panel at the door;

a bent side wall unit extended from a periphery of the main body unit to form a predetermined space;

a pushing member integrally formed with a flange unit extended from the bent side wall unit and bent outwardly, so as to face the torso of a passenger.

DETAILED DESCRIPTION OF THE INVENTION

A preferred embodiment of the present invention will now be described in detail with reference to the accompanying drawings.

Figure 1:
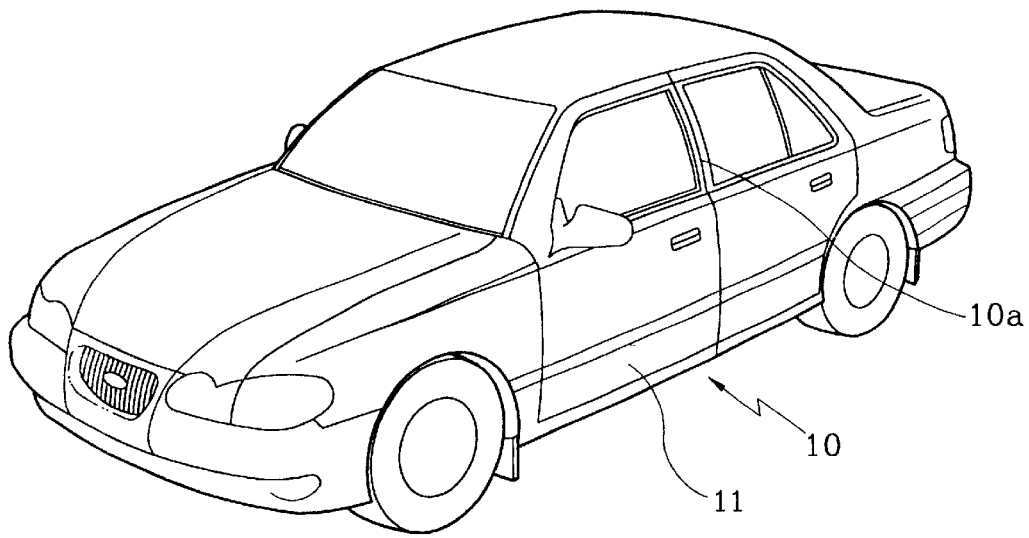
FIGS. 1 and 2 are perspective views for illustrating a vehicle and a door thereof according to the prior art.
Figure 2:
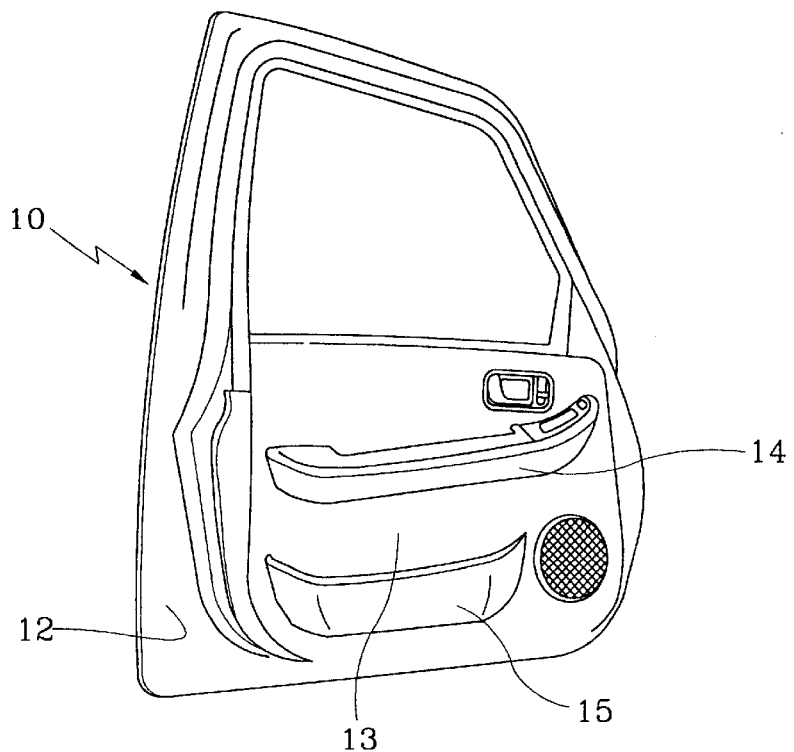
Figure 3:
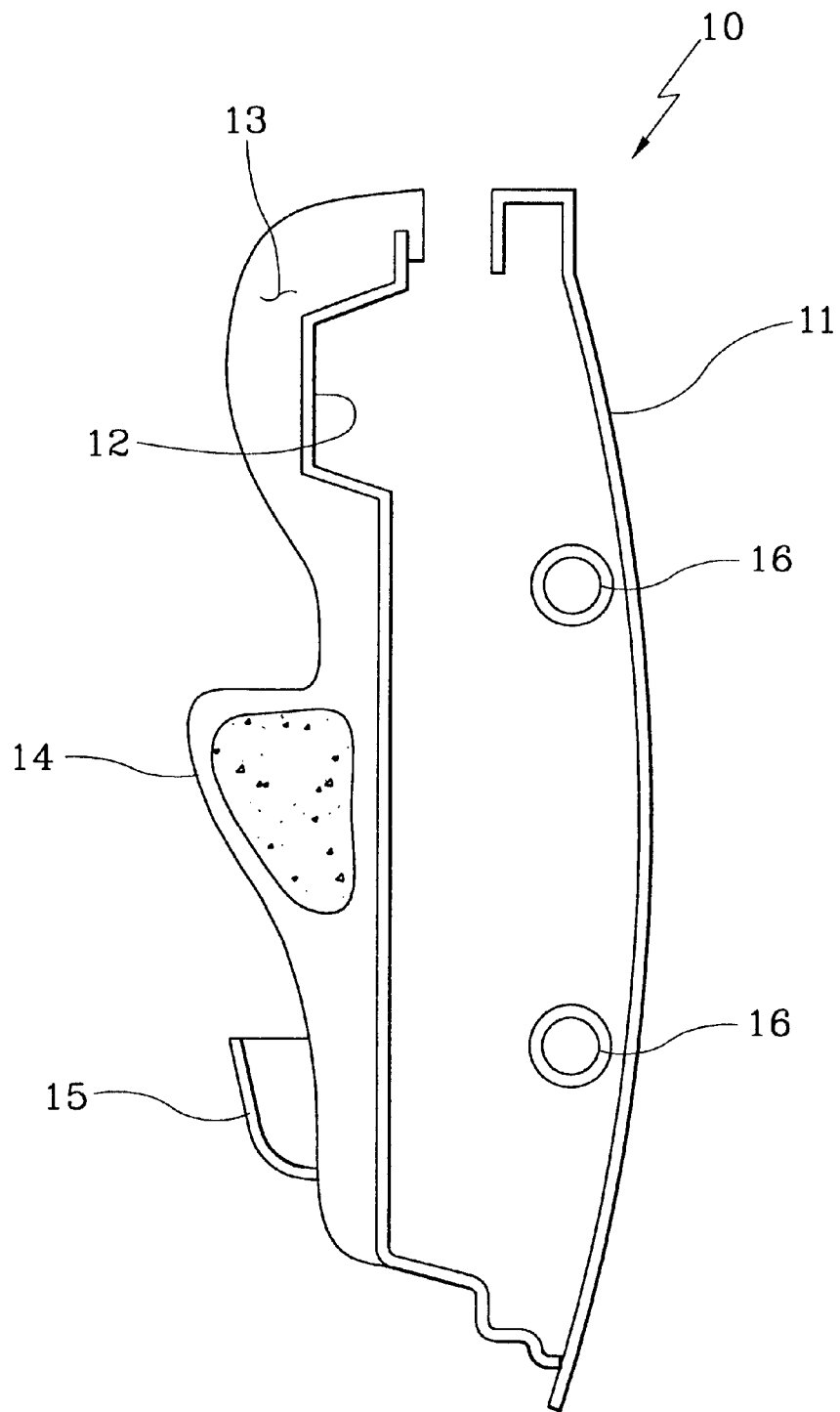
FIG. 3 is a longitudinal sectional view of a door according to the prior art.
Figure 4:
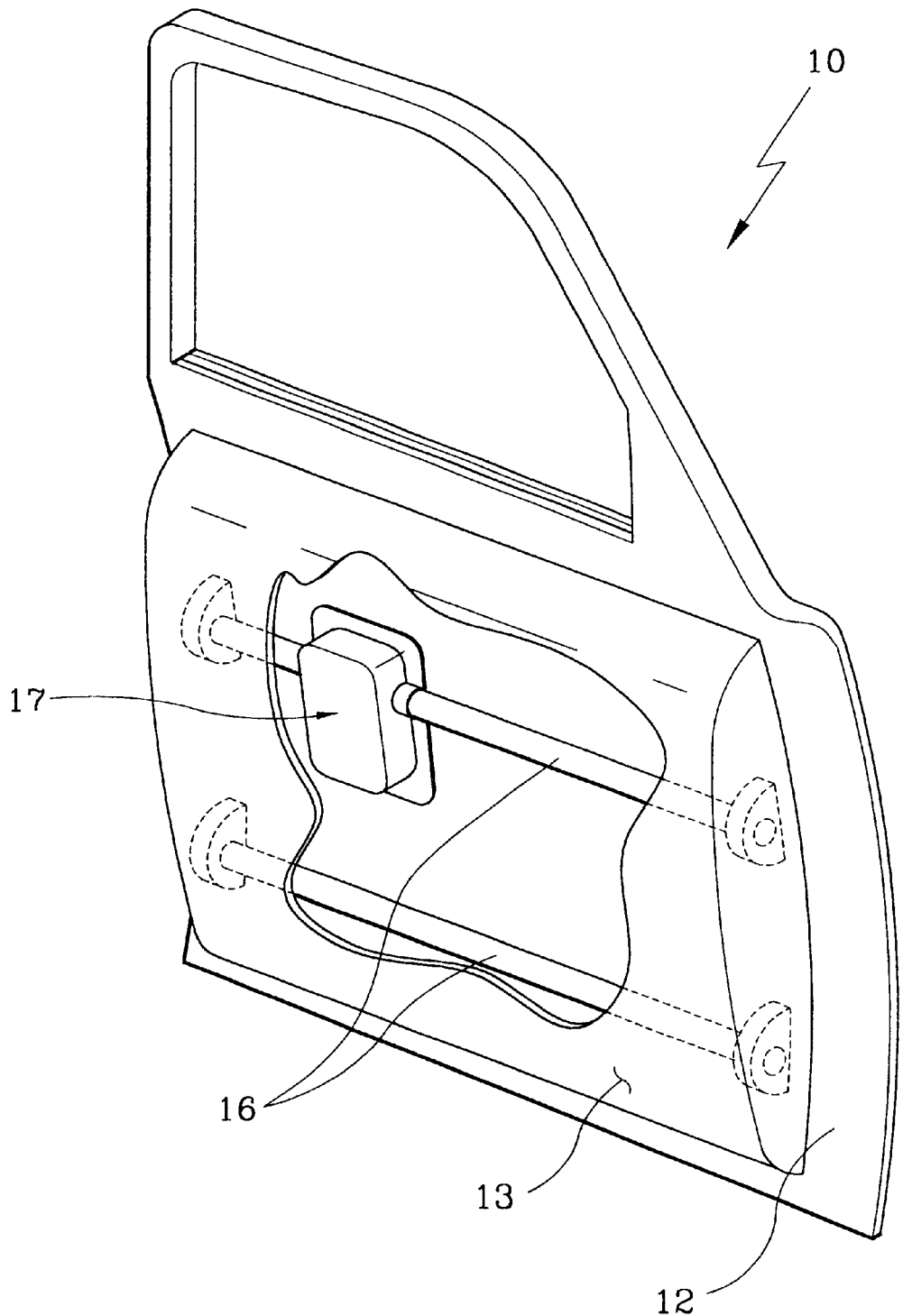
FIG. 4 is a perspective view of a door according to the present invention.

The present invention, as illustrated in the Figures, includes a pushing member 17 forming a closed sectional surface toward an inner circumferential surface of the outer panel 11 at the door 10. The pushing member 17 is arranged at an upper reinforcing member 16 out of the two reinforcing members 16 longitudinally extended in a space formed by the outer panel 11 and the inner panel 12 at the door 10, and particularly, the pushing member 17 is eccentrically provided toward the rear side of the upper reinforcing member 16 so as to approach and face a center filler 10a (see FIG. 1).

Figure 5:
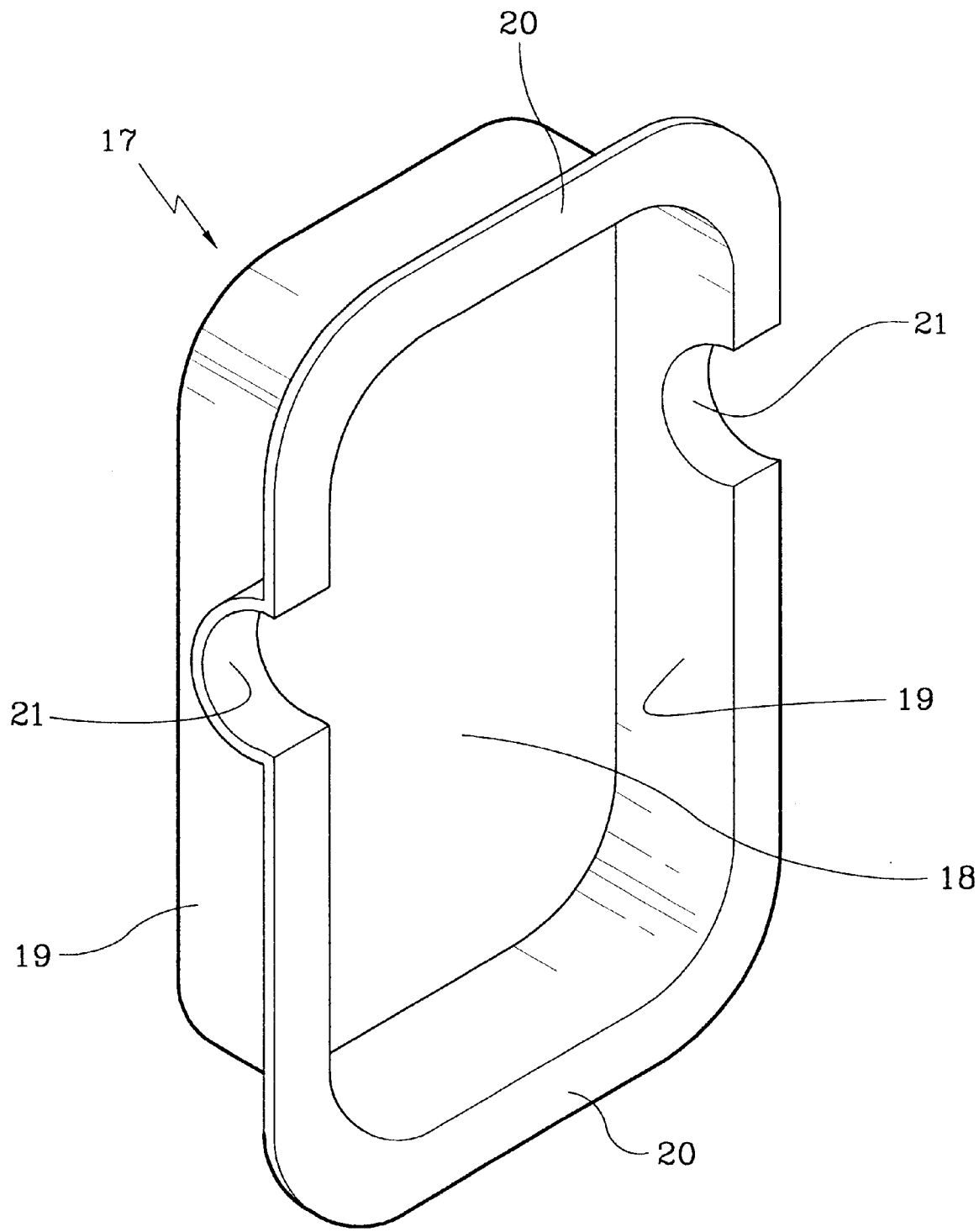
FIG. 5 is a perspective view for illustrating an enlarged principal part in FIG. 4.
Figure 6:
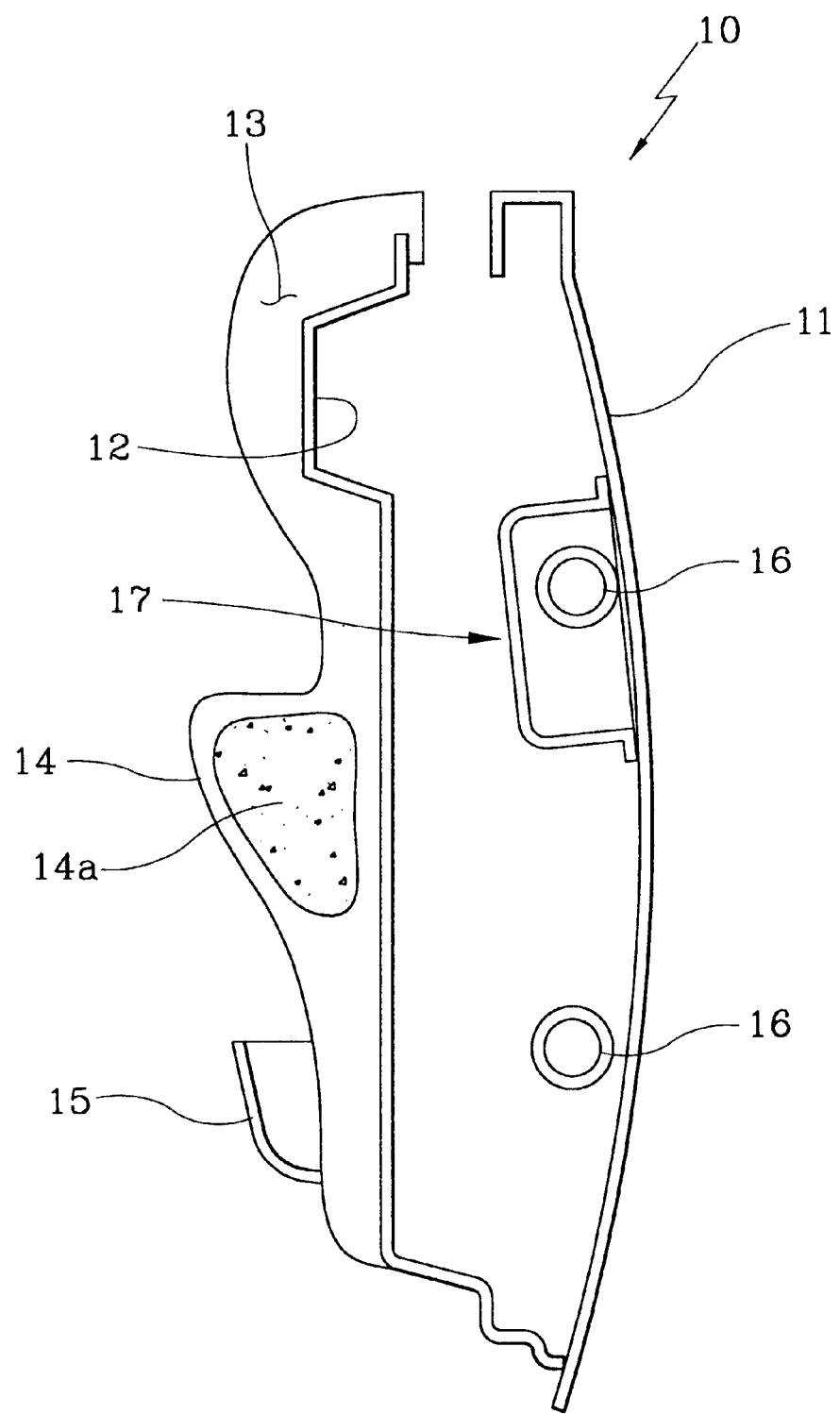
FIG. 6 is a longitudinal sectional view of a door according to the present invention.

In other words, the installed position of the pushing member 17 corresponds to an area facing a side of the upper part of a front seat passenger according to deformity of the door 10 by shock from a side collision of a vehicle, such that the pushing member 17 is overlapped with the upper reinforcing member 16 out of two reinforcing members disposed inside the door 10 to contact and be fixed to an inner surface of the outer panel 11 at the door 10. The pushing member 17 therefore includes, as illustrated in FIG. 5, a main body unit 18 frontly opened, a bent side wall unit 19 extended from a periphery of the main body unit to form a predetermined space and a flange unit 20 extended to the side wall unit 19, bent outwardly and directly contacting an inner side surface of the outer panel 11.

Furthermore, the pushing member 17 is respectively formed at the side wall unit 19 with opening units 21 cut to provide a clearance space for the reinforcing member so as to contact an inner side surface of the outer panel 11 without being interfered by the reinforcing member 16 horizontally arranged inside the door 10.

When the pushing member 17 contacts and is fixed to the inner side surface of the outer panel 11 toward the upper torso of the passenger into the void space formed by the outer panel 11 and the inner panel 12 at the door 10, the outer panel 11 is deformed and pushed into the inside of a vehicle by the shock transmitted to the outer panel of the door 10 when the vehicle is sideswiped, such that the pushing member 17 contacting the inner side surface of the outer panel 11 contacts the inner panel 12 ahead of the outer panel 11 deforming into the inside of the vehicle to also deform the inner panel 12 toward the inside of the vehicle. As a result thereof, an arm rest 14 of trim material 13 attached to the inner panel 12 reaches the side of the passenger.

At this time, the passenger body is pushed toward inside of the vehicle by a cushioning material 14a filled in the arm rest 14 which the shock is alleviated, and then the outer panel 11 is adhered to the inner panel 12, leaving almost no void therebetween, to be deformed and pushed into the inside of the vehicle.

In other words, the passenger is not directly exposed to the strong shock during the side collision while the outer panel 11 and the inner panel 12 are completely adhered therebetween to complete the deformation, but pushed inside the vehicle by a rather weaker shock of the arm rest 14 of the trim member 13 pushed by the pushing member 17 first deformed by being contacted by the outer panel, to thereby avoid the strong shock transmitted via the deformity of the outer panel 11 and to lessen the degree of shock inflicted by the side collision compared with the shock according to the prior art.

Figure 7:
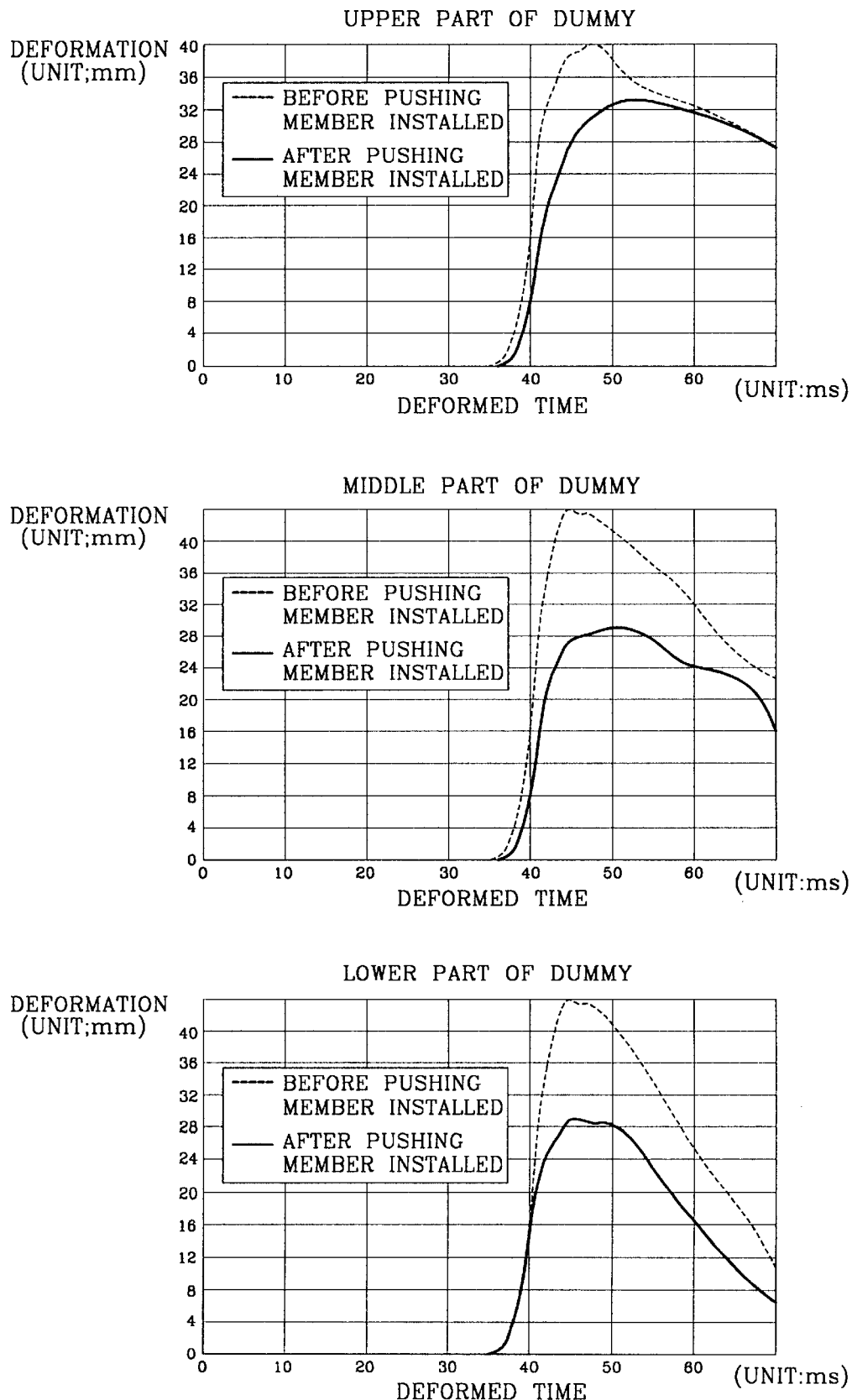
FIG. 7 is a graph for illustrating a deformation versus time of a dummy during a side collision before and after installation of the pushing member.

This kind of inference was obtained by a collision test of dummies against a state where the pushing member 17 is installed at an inner side surface of the outer panel 11 and a state where the pushing member 17 is not mounted, whereby the inference is certified by a graph shown in FIG. 7 which measured a deformed degree versus time by the shock applied to each part of upper/middle/lower body of the dummy.

In other words, in the deformed time versus deformed degree relative to the upper/middle/lower body of the side of the dummy, a deformed time consumed for reaching the same degree of deformity is shown to be lengthened in the case of the pushing member 17 installed at the outer panel 11 (solid line) than in the case of the pushing member 17 not installed (dotted line).

Furthermore, it was also shown in the test that the degree of final degree of deformation is less in the case of installment of the pushing member 17 (solid line) than in the case of no installment of the pushing member (dotted line).

Still furthermore, degree of deformation against each side area of upper/middle/lower part of the dummy with the pushing member mounted was all within the related regulations (European regulations limiting the degree of deformity of a dummy with regard to side collision), meaning that related regulations are satisfied.

According to the test result, the pushing member 17 reaches each upper/middle/lower part of the dummy approximately 5 ms ahead of the outer panel 11 to transmit a weak shock at the initial stage of the side collision and to move the dummy a bit toward the inside of the vehicle. Then it is revealed from the test that a complete deformation of the outer panel 11 along with the strong shock transmitted has less effect on the dummy due to the earlier movement of the dummy towards the inside of the vehicle away from the door.

Conclusively, in consideration of the fact that the degree of shock caused by initial collision during side collision accident of a vehicle is weaker than the degree of shock caused by the collision of last stage after laps of a predetermined period of time after collision, it can be concluded that the installment of pushing member 17 inside the door 10 can expect a greater effect of safety guarantee than installment of other means of safety device or consideration of safety to the passenger such as structural reinforcement of reinforcing member 16 and the like.

As apparent from the foregoing, there is an advantage in the door structure of a vehicle according to the present invention in that installment inside the door of a pushing member contacting an outer panel at a position facing a side of an upper body of a passenger causes the passenger to be pushed beforehand inside the vehicle by an initial weak shock during a side collision of the vehicle and the strong shock of last stage not to be directly transmitted to the passenger, remarkably decreasing the injury of the passenger.

What is claimed is:

1. A door structure of a vehicle for protecting a passenger seated adjacent to the door structure from a side impact collision, the door structure including an inner panel and an outer panel and a reinforcing member, wherein a pushing member spanning less than a majority of the horizontal width of the door structure is fixed at an inner surface of the outer panel and is fitted over the reinforcing member so as to face the seated passenger; the pushing member comprising a main body unit, a bent side wall unit extended from a periphery of the main body unit to form a predetermined space, and a flange unit extended from the side wall unit, bent outwardly and directly contacting the inner surface of the outer panel.

2. The pushing member of claim 1, wherein the side wall unit includes clearance openings which allow the main body unit to fit over the reinforcing member such that the flange unit contacts the inner surface of the outer panel without interfering with the reinforcing member which is horizontally arranged inside the door structure.

3. A door structure of a vehicle for protecting a passenger seated adjacent to the door structure from a side impact collision, the door structure comprising:

an inner panel and an outer panel, with an upper horizontal impact bar attached to the outer panel;

a pushing member spanning less than a majority of the horizontal width of the door structure, positioned between the inner and outer panels, fixed to an inner surface of the outer panel about the upper impact bar, and facing the seated passenger; and wherein the pushing member includes a main body unit comprising a bent side wall unit having clearance openings for providing clearance between the side wall unit and the upper impact bar, the side wall unit being extended from a periphery of the main body unit to form a predetermined space, and a flange unit extended from the side wall unit, bent outwardly and directly contacting the inner surface of the outer panel.

* * * * *